United States Patent [19]
Rafal et al.

[11] Patent Number: 4,475,242
[45] Date of Patent: Oct. 2, 1984

[54] MICROWAVE COMMUNICATIONS SYSTEM

[76] Inventors: Marc Rafal, 1517 Cotherstone Dr., Durham, N.C. 27712; William T. Joines, 4010 Deepwood Cir., Durham, N.C. 27710; Larry W. Burton, 1647 Cole Mill Rd., Durham, N.C. 27705

[21] Appl. No.: 440,628

[22] Filed: Nov. 10, 1982

[51] Int. Cl.³ .......................... H04B 1/02; H04H 1/00
[52] U.S. Cl. .......................................... 455/3; 455/53; 455/109; 455/20
[58] Field of Search ..................... 455/3, 6, 20, 46, 47, 455/53, 108, 109; 358/86, 186; 332/31 R, 44, 45

[56] References Cited

U.S. PATENT DOCUMENTS

| | | |
|---|---|---|
| 3,593,139 | 11/1971 | Hershberg .............................. 455/20 |
| 3,623,105 | 11/1971 | Kamen ..................................... 455/3 |
| 4,183,054 | 1/1980 | Patisaul et al. ........................... 455/3 |

*Primary Examiner*—Jin F. Ng
*Attorney, Agent, or Firm*—Darby & Darby

[57] ABSTRACT

A microwave transmitter comprises a signal modulator for receiving an input signal that includes up to 75 video and audio channels and producing an amplitude modulated signal in the microwave frequency range corresponding thereto. An amplifier responsive to the microwave frequency signal produces an amplified output signal suitable for transmission to a remote location. The signal modulator and the amplifier have upper power limits which are sufficiently below their respective two-tone third order intermodulation intercept points that the carrier-to-triple-beat power ratios of each are respectively at least equal to first predetermined values. The gain of the amplifier is high enough that, notwithstanding the power limitation imposed on the microwave frequency signal by virtue of the upper power limit of the signal modulating means, the power of the amplified output signal is at least equal to a second predetermined value. The sum of the gain and the noise figure of the transmitter measured in decibels has an upper limit determined by the desired carrier-to-noise ratio and by thermal noise.

12 Claims, 3 Drawing Figures

MICROWAVE COMMUNICATIONS SYSTEM

BACKGROUND OF THE INVENTION

This invention relates to microwave communications systems and, in particular, to a microwave communications system comprising a novel and highly effective transmitter which will allow the simultaneous transmission of a multiplicity of information channels over substantial distances.

A microwave relay provides a convenient means of getting a signal from one point to some distant point without running a cable between the two points. Microwave relays were first developed and used by the Bell System to reduce the cost of long distance telephone lines. Later, microwave links were used by the television broadcast industry to connect a studio to its transmitter station. These Studio-to-Transmitter Links (STL) were required to carry only one video channel and one audio channel from the studio to the transmitter, which might be located from one to twenty miles away. This same equipment was also used to bring network programming to the local affiliates for local broadcast.

In the early days of the CATV industry, before the use of satellite communications, these same microwave links were used to bring in distant television stations for local distribution over cable. Again, these links required only the capability of a single program channel. As the CATV industry matured, the U.S. Federal Communications Commission, recognizing the growth in usage by CATV operators, set aside a band of frequencies near 13 GHz for this service. The allocation of this band, known as the Cable Relay Service (CARS) band, has opened the way for many other applications.

One such application has been the use of a microwave relay to extend the service area of a CATV system. In order to accomplish this, the relay must be capable of carrying multiple television channels. The manufacturers of the original single-channel STL systems have responded to this demand by essentially stacking multiple transmitters in parallel in order to achieve the desired number of channels. Thus a 24-channel system would require 24 single-channel transmitters connected to a single transmitter parabolic (dish) antenna at a cost the currently exceeds $150,000. Such a cost can be accepted only if the community being connected has a very large subscriber base.

A typical microwave relay system may include a central headend system and a single transmitter with multiple dish antennas pointing toward each of several nearby communities. Within each community a single receiver aimed at the transmitter processes the signals for distribution via conventional CATV technology. A single transmitter is able to serve communities within a radius of up to twenty miles (for example) and have links in any number of directions. Thus, a single transmitter can serve a large number of communities.

By interconnecting these communities in this way, the cost of headend equipment is shared by a larger subscriber base while at the same time the cost of the trunkline system is significantly reduced. To better accomplish this cost sharing a low cost microwave relay system must be used.

By way of example, microwave relays that operate in the 12.7 to 13.2 GHz band will be described. There are two classes of microwave relay systems which can operate in this band: Amplitude Modulated (AM), and Frequency Modulated (FM). In both of these systems, a transmitter system can be shared by several links. By appropriately connecting the transmitter to dish antennas pointed in different directions, several areas can be served by a single transmitter.

Frequency modulated links provide the most reliable low noise transmission with the lowest transmitted power. Because of its reliability and noise performance, an FM link is often used for STL systems. FM is also used for mobile systems in order to reduce the required output power.

There are, however, several drawbacks to an FM system. Of primary concern is the high cost of both the transmitter and the receiver. Second, the effective bandwidth required of an FM signal for a microwave relay is four times that of a vestigial sideband AM signal. This means that, for a given bandwidth, only one-fourth as many stations can be carried. Finally, an FM system requires separate transmission and reception equipment for each television channel to be carried.

Amplitude modulated links can provide an economical method of relaying multiple television stations. With an AM transmitter all channels can be transmitted and received with a single transmitter and receiver. However, conventional amplitude modulated links do not take full advantage of the multiple channel capability of an AM system. By properly selecting the components of the multiple channel transmitter as shown below, a significant cost reduction can be achieved as compared to single channel transmitters.

OBJECTS OF THE INVENTION

A primary object of the invention is to provide a microwave communications system that reduces the cost of CATV service to sparsely settled areas.

Another object of the invention is to maximize the number of information channels that can be transmitted a given distance by a single transmitter in a microwave relay system.

Another object of the invention is to maximize the distance that a given number of information channels can be transmitted by a single transmitter in a microwave relay system.

A further object is to provide a microwave power amplifier system capable of use in a microwave transmitter where a multiplicity of information bearing channels are to be simultaneously relayed a substantial distance on a microwave carrier frequency.

SUMMARY OF THE INVENTION

The objects of the invention are attained in a microwave transmitter comprising signal modulating means for receiving an input signal that includes a plurality of video channels and producing an amplitude modulated signal in the microwave frequency range corresponding thereto, and amplifier means responsive to the microwave frequency signal for producing an amplified output signal suitable for microwave transmission to a remote location.

In accordance with the invention, the signal modulating means and the amplifier means have upper power limits which are sufficiently below their respective two tone third order intermodulation intercept points that the carrier-to-triple-beat power ratios of each are respectively at least equal to first predetermined values. These values depend at least in part on the number of channels to be transmitted. Moreover, the gain of the amplifier means is high enough that, notwithstanding power limitations of the signal modulating means, the power of the amplified output signal is at least equal to a second predetermined value. Such second predetermined value depends at least in part on the distance between the transmitter and the receiver. Finally, the sum of the gain and the noise figure of the transmitter measured in decibels has an upper limit determined by the desired carrier-to-noise ratio and by thermal noise.

BRIEF DESCRIPTION OF THE DRAWINGS

A better understanding of the invention may be gained from a consideration of the following detailed description of the preferred embodiments thereof, in conjunction with the appended figures of the drawings, wherein.

DESCRIPTION OF THE PREFERRED EMBODIMENTS

Figure 1:
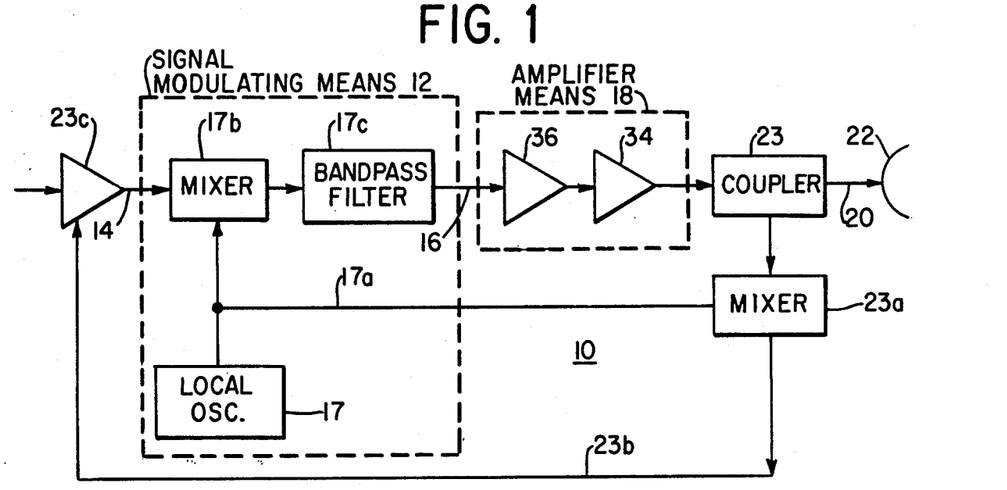
FIG. 1 is a block diagram of a preferred embodiment of a microwave transmitter according to the invention.

FIG. 1 shows a microwave transmitter 10 according to the invention. It comprises a signal-modulating meeans 12 for receiving an input signal on an input 14. The input signal may be a VHF input of 50-500 MHz, typically at 18 dBmV, and includes a plurality of video channels (for example, up to 75). The signal modulating means 12 produces an amplitude modulated signal on a line 16 corresponding to the VHF input signal and having a frequency in the microwave frequency range.

The signal modulating means 12 comprises a local oscillator 17 which produces a reference signal "LO" at a frequency (for example) of 12.6465 GHz on a line 17a, and a mixer 17b jointly responsive to the input signal on the line 14 and the reference signal on the line 17a. The mixer up-converts the VHF signal on the line 14 to the microwave frequency range. The signal modulating means 12 further comprises a bandpass filter 17c which has a pass band (for example) from 12.7-13.2 GHz. The output of the filter 17c is the modulated signal on the line 16.

The apparatus 10 also comprises amplifier means 18 responsive to the microwave frequency signal on the line 16 for producing an amplified output signal on a line 20 suitable for microwave transmission to a remote location, for example by means of a dish antenna 22.

The output on the line 20 is in a portion of the microwave spectrum allocated to CATV operators for the purpose of bringing distant signals to a local headend for subsequent cablecast and may be charaterized as a CARS band output.

A coupler 23 samples the output on the line 20 and supplies it to a mixer 23a. The mixer 23a receives a second input from the line 17a and produces a VHF output on a line 23b which provides automatic gain control to an amplifier 23c to maintain the signal on the line 20 at the desired output level. The signal on the line 23b can also be supplied to a TV receiver so that the quality of the transmitted signal can be monitored.

In accordance with one aspect of the invention, the signal modulating means 12 and the amplifier means 18 have upper power limits which are sufficiently below their respective two-tone third order intermodulation intercept points that the carier-to-triple-beat power ratios of each are respectively at least equal to first predetermined values.

The maximum permissible signal level at each stage will be set by the intermodulation distortion of the nonlinear elements in the system. The limiting factor will be the third order nonlinearity of each amplifier and mixer. Amplifiers intended for CATV applications, e.g. VHF amplifiers designated for multiple AM carriers, are generally specified as having a carrier-to-composite-triple-beat ratio at a specified output level for a given number of channels.

Composite triple beat is a measure of the amplitude of third order beats in a system. A triple beat is a frequency component due to the presence of three signal frequencies and is at a frequency of $f_1+f_2-f_3$. For a given number of channels there will be a set number of triple beats. For example, a 24 channel system has a maximum of 120 triple beats per channel. Another type of beat (referred to as a two tone third order beat) at a frequency of $2f_1-f_2$ will also be present in smaller numbers. This beat turns out to be lower in amplitude by 6 dB, i.e. one-fourth the power. A 24 channel system will have a maximum of 11 such beats per channel. In order to describe the total number of beats with a single number, it is desirable to first define an equivalent triple beat as a beat having the same level as a triple beat or four times the level of a two tone third order beat. The number of equivalent beats per channel is equal to the number of triple beats plus one forth the number of two-tone third order beats. A composite triple beat may be defined as a single beat having the same power level as the sum of all equivalent beats in the channel. The number of equivalent triple beats per channel for several numbers of channels is tabulated below.

| No. of Channels | Total Equivalent Triple Beats per Channel (Worst Case) |
| --- | --- |
| 12 | 40 |
| 24 | 120 |
| 36 | 350 |
| 54 | 1000 |

Subjective tests with large numbers of observers have established levels at which the commmposite triple beat will become perceptible. This level is different for different number of channels; in general, the larger the number of channels, the greater the level of the composite triple beat. For a large number of channels, the level of perceptibility in dB below carrier is given approximately by $$53 + 10 \text{ Log } N$$

where N is the number of equivalent triple beats per channel. Manufacturers of CATV equipment provide easily-applied composite triple beat data on their equipment.

Microwave amplifiers are not generally used in the CATV industry and are most often used in single-carrier systems. Third order distortion, while present, is not a limiting factor in these applications. Therefore, composite triple beat performance is not specified for microwave amplifiers.

Figure 3:
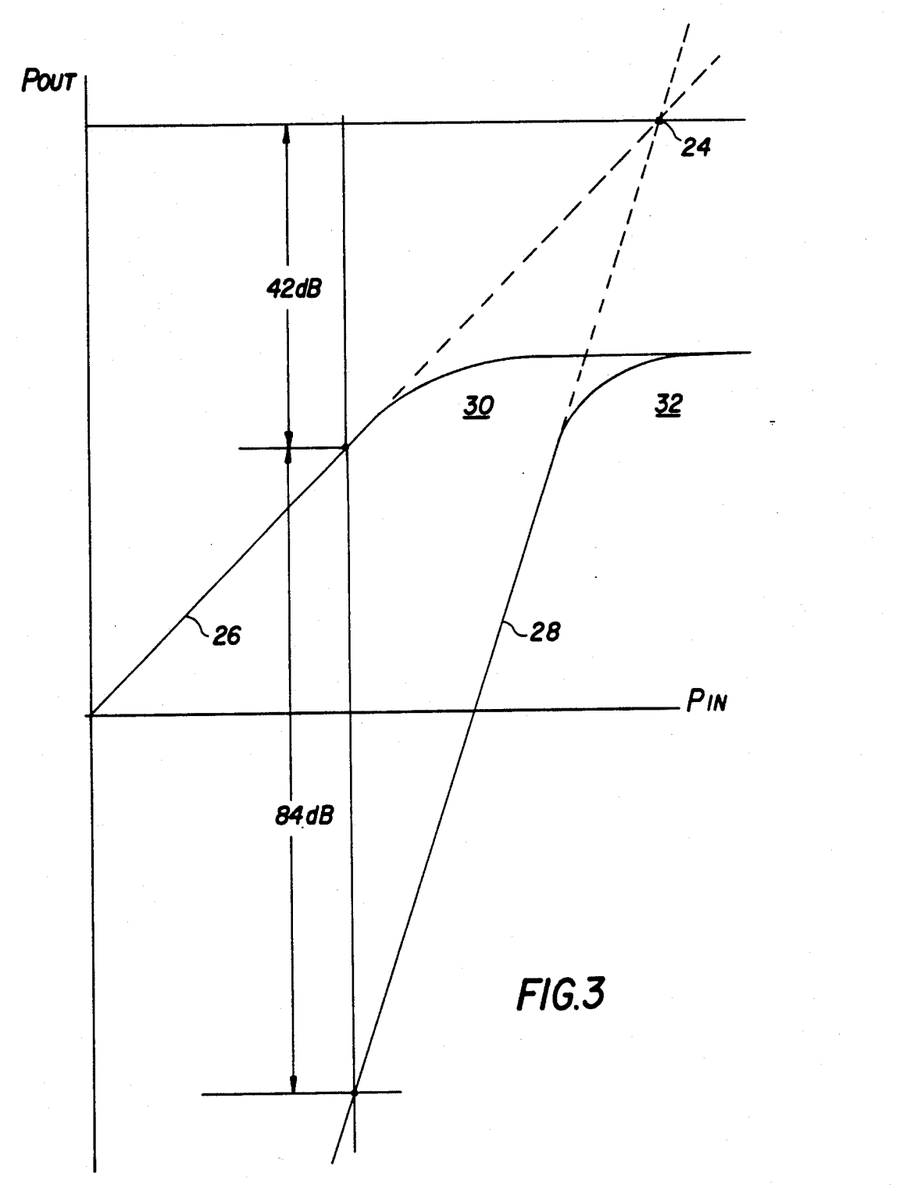
FIG. 3 is a graph that shows the output power of the transmitter fundamental and two-tone intermodulation level (intermods) as a function of transmitter input power and also shows as an extrapolation the two-tone third order intermodulation intercept point.

A specification often provided (or easily measured) for a microwave amplifier is the two-tone third order intermodulation intercept point. FIG. 3 shows the two-tone third order intermodulation intercept point 24 for a representative piece of equipment, for example a transmitter or a portion of a transmitter, such as an amplifier or a mixer. The point 24 is an extrapolation of linear portions 26 and 28 of curves 30 and 32, respectively. The curve 30 is a graph of the output power of the fundamental, and the curve 32 is a graph of the two tone output power of the third order intermodulation level, each as a function of input power. The linear portion 26 has a slope of 1:1, and the linear portion 28 has a slope of 3:1. The point 24 is the hypothetical point at which the fundamental and two tone third order intermodulation level would be at the same output power. When the input power is such that the fundamental and two tone third order intermodulation level are within the respective linear portion 26 and 28, an increase or a decrease in input power increases or decrease the two tone third order intermodulation level three times as much as it increases or decreases the fundamental. Therefore the ratio of the level of fundamental frequency (e.g. carrier) to the two tone third order intermodulation level is increased by 2dB for each 1dB reduction in fundamental input level.

In order to use this available information regarding the two tone third order intercept point, the correspondence between the two-tone third order intermodulation level and the composite triple beat level must be found. This correspondence is derived as follows. Recall that the total composite triple beat level is the sum of the powers of a given number of equivalent triple beats. The power of each equivalent triple beat is then the composite triple beat level divided by the number of equivalent triple beats. Also recall that a triple beat is 6 dB higher in level than a two-tone third offer beat. Therefore, the two-tone third order level is one fourth (6 dB less than) the equivalent triple beat level. Correspondingly, the two tone level of perceptibility is 6 dB lower than the triple beat level of perceptibility.

If the amplifier is to be operated at a given level of perceptibility, the carrier output power must be an appropriate number of dB below the two tone third order intercept point. A carrier-to-two-tone beat level, for example, −84 dBc, (corresponding to a carrier to equivalent triple beat level of −78dBc) can be chosen for, say, 54 channels. From the discussion above, the carrier output level must therefore be one-half this amount or 42 dB below the intercept point. This defines the maximum output power to yield the desired intermod performance. That is, if the carrier level is 42 dB below the intercept (as yet unspecified in this example), the two tone third order beat level will be 84 dB below the carrier and the triple beat level will be 78 dB below the carrier, as desired.

The absolute transmitted power for a sample 15-mile link must be greater than 6 dBm per microwave carrier depending on antenna characteristics, fade margin, etc. Continuing the previous example, if 54 channels are to be transmitted, the intercept point should be 42 dB above the carrier output. The absolute power level minimum intercept point will be given by Intercept = 6+42 = 48 dBm.

The carrier-to-triple-beat power ratios of both the signal modulator means 12 and the amplifier means 18 have lower limits in accordance with the preceding discussion regarding perceptibility of intermodulation distortion. In order to achieve a certain minimum carrier-to-beat ratio of the signal on the line 16, which is the output of the signal modulating means 12 and the input to the amplifier means 18, the signal on the line 16 must be of relatively low power. This requires that the amplifier means 18 have a certain minimum gain. Specifically, the gain of the amplifier means 18 must be high enough that the power of the amplified output signal on the line 20 is at least equal to some predetermined value which is sufficient to enable transmission to a remote location which may be, for example, as much as 15 miles distant. This minimum gain, $G_T$, ensures that the output level of the preceding signal modulator 12 will be low enough to stay well within the linear region 26, 28 shown in FIG. 3.

The amplifier means 18 may comprise an output travelling wave tube (TWT) amplifier 34 preceded by a transistor preamplifier 36. If the preamplifier 36 has a +28 dBm intercept point, the output must be limited to −17 dBm in order to ensure that the intermods are down 90 dB at the input to the power amplifier 34. Since the minimum transmitter output must be 6 dBm, the power amplifier 34 must have a minimum gain of 23 dB.

In a second preferred embodiment, the preamplifier 36 and amplifier 34 may be combined as a single solid state FET amplifier. For a 54 channel system and maximum power output of −1 dBm, the gain is 35 dB, the intercept point 40 dBm, and the noise figure 8 dB.

The sum of the gain and the noise figure of the transmitter 10 measured in decibels has an upper limit determined by the desired carrier-to-noise ratio and by thermal noise.

Any device at a temperature above absolute zero will exhibit thermal noise. The noise can be expressed as a function of absolute temperature (T), bandwidth (B) and Boltzman's constant (K), where $K = 1.38 \times 10^{-23} J/K°$, as $$N = KTB \tag{1}$$

Active devices exhibit noise in excess of that predicted by equation (1). Consider an amplifier of gain G connected to a noise free source through a source resistance. The source resistance will contribute an amount of noise equal to KTB as predicted by equation (1), so that, at the input, the signal-to-noise ratio will be $$S/N \text{ at input} = S_i/KTB \tag{2}$$

At the output, the signal will have been amplified by the power gain G, along with the noise KTB. In addition, the noise contribution of the amplifier may be modeled as occurring at the input. Thus, the signal-to-noise ratio at the output will be $$GS_i/G(KTB + N_a) \tag{3}$$

A figure of merit may be defined as $$NF = \frac{\frac{S}{N} \text{ Input}}{\frac{S}{N} \text{ Output}} = \text{Noise Factor} \tag{4}$$

which simplifies to $$NF = \frac{\frac{S_i}{KTB}}{\frac{S_i}{KTB + N_a}} = \frac{KTB + N_a}{KTB} = 1 + \frac{N_a}{KTB} \quad (5)$$

Since NF is often expressed in dB, it is convenient to rewrite equation (5) as $$NF = N_A/KTB$$

where
$$N_A = KTB + N_a \quad (6)$$

so that $N_A$ is the total noise at the input to the amplifier, including excess noise and the thermal noise of the source resistance. Thus, if $$F = 10 \text{Log}(NF)(\text{in dB}), \text{ then}$$

$$N_A(\text{in dB}) = 10\text{Log}(KTB) + F(\text{in dB}) \quad (7)$$

and the ratio of $S_i/N_A$ will be the output signal-to-noise ratio.

In summary, for an amplifier of noise figure F dB, the output signal-to-noise ratio will be $$S/N \text{ output (in dB)} = S_i(\text{in dB}) - 10\text{Log}(KTB) - F \quad (8)$$

Modulation and Noise

When a baseband signal is modulated, the information is in general contained within the sidebands in the neighborhood of the modulating carrier. In this case it is necessary to calculate the noise added to the carrier and the sidebands as detailed above to compute a carrier-to-noise ratio. However, for the system to be useful, the information must be demodulated or returned to baseband. The resulting signal-to-noise ratio will in general be different from the computed carrier-to-noise ratio. The amount of difference will depend on the type of modulation.

There are, in fact, four steps involving modulation or demodulation in a complete system that embodies the present invention, but the present invention is concerned with only two of them. First, each baseband video signal is vestigial sideband modulated onto a VHF carrier at the television station or CATV hendend. Second, the VHF spectrum containing the modulated carriers is again modulated, using single sideband (SSB) suppressed carrier modulation to microwave frequencies (FIG. 1). Third, this modulation is demodulated back to VHF by the receiver shown in FIG. 2. Fourth, the VHF signal is ultimately demodulated to baseband by a television receiver (not shown). The present invention relates particularly to step two but also to step three in that the latter involves demodulation of a signal that has been modulated in accordance with the invention.

Figure 2:
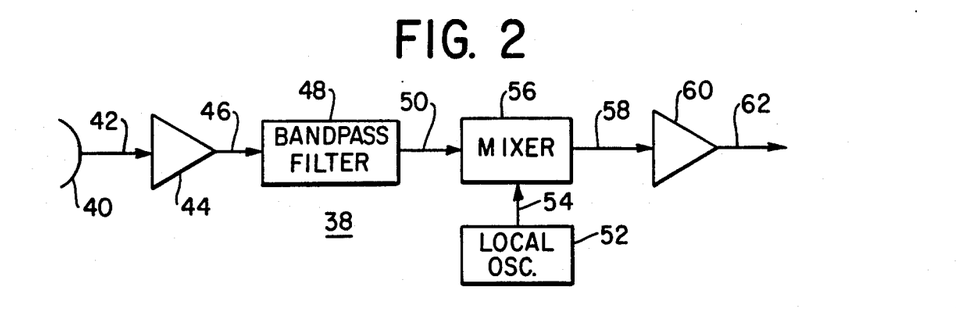
FIG. 2 is a block diagram of a receiver for use with the transmitter of FIG. 1.

FIG. 2 shows the major components of a typical receiver 38, which is conventional per se. Other configurations, conventional or otherwise, may also be used. A dish antenna 40 receives the microwave signal transmitted by the dish antenna 22 of the transmitter 10 and suplies the signal on a line 42 to a transistor amplifier 44 having a 22 dB gain. The amplifier 44 supplies an amplified output on a line 46 to a bandpass filter 48 having a pass band of 12.7 to 13.2 GHz. The bandpass filter 48 supplies a filtered output on a line 50. A local oscillator 52 having a frequency of 12.6465 GHz, the same as the frequency of the local oscillator 17 of the transmitter 10, supplies a reference signal "LO" on a line 54.

A mixer 56 receives the signal on the lines 50 and 54 and produces a signal on a line 58 which is demodulated back to VHF and corresponds to the microwave input on the line 42. The signal on the line 58 is amplified by a VHF amplifier 60 with automatic gain control. The amplifier 60 produces an output on a line 62 for local distribution.

In order to examine the noise performance of an SSB receiver, we must define carrier-to-noise ratios. The signal-to-noise ratio before the mixer will be defined as the predetection carrier-to-noise ratio, and the carrier-to-noise ratio of the mixer output will be defined as the post-detection carrier-to-noise ratio.

Ignoring losses in the mixer 56 (i.e. assuming an ideal noise-free mixer) the output of the mixer 56 will contain the frequency translated spectrum, i.e. the VHF signals from 50 to 500 MHz which occupied the input microwave spectrum at LO+VHF. The frequency spectrum LO−VHF will also be translated and folded over to fall in the same output spectrum.

Since this lower sideband contains no signal, it does not contribute to the output power. However, any noise in this band will be added to the noise in the output. If it is assumed that the noise is uniform across the band, the lower sideband will add 3 dB to the noise. Thus, with an ideal mixer the post-detection carrier-to-noise ratio is 3 dB lower than the predetection carrier-to-noise ratio. This three dB loss can be avoided if a filter is inserted before the mixer, eliminating the lower sideband noise. Thus, the post-detection and predetection carrier-to-noise ratios would be equal. An input filter at the receiver is, therefore, equivalent to an additional 3 dB gain in the antennas or three dB more transmitted power. In terms of the noise performance, since a filter is considerably cheaper than an additional 3 dB of amplifier gain, a filter should be used.

A mixer will typically have a conversion loss of about 7 dB at 13 GHz and a noise figure 1 dB above the loss. A bandpass filter will have a pass band loss of about 0.5 dB. The total noise figure will be $$NF = 1.12 + 5.3/(1/1.12) = 7.056 - 8.5 \text{ dB} \quad (9)$$

If we assume a target C/N ratio at the output of the mixer of 50 dB and a video bandwidth of 4 MHz, the total input noise at the receiver 38 will be $$10\text{Log}(KTB) + 8.5 = -108 + 8.5 = -99.5 \text{ dBm} \quad (10)$$

However, the transmitter 10 will also broadcast noise at some ratio below its carrier output. If we assign equal noise contributions from the transmitter 10 and the receiver 38, there will then be twice as much noise power at the receiver 38 (3 dB higher) or −96.5 dBm. The carrier will have to be greater than 50 dB above this point or $$50 - 96.5 = -46.5 \text{ dBm} \quad (11)$$

Since this is the minimum noise performance, the actual received signal power must be higher by the amount of the desired fade margin. The received power can be calculated from the transmitted power, link losses and antenna gains as $$P_R = P_T + G_{A1} + G_{A2} - L_{path} - L_{misc.} \quad (12)$$

The path loss is given by (typically)

$$L_{path} = 96.6 + 20 \log F + 20 \log D \quad (13)$$

where
F = Frequency in MHz
D = Distance in Miles
At
ti 13 GHz, 20 Log F = 22.28 so that
$$L_{path} = 118.9 + 20 \log D$$

For a 15 mile link the loss is then 142.4 dB.

Six foot dishes typically have about 45 dB gain and miscellaneous losses will run about 1 dB. The received power will then be $$P_R = P_T + 45 + 45 - 142.4 - 1 = P_T - 53.4 \quad (14)$$

If the received power is to be −46.5 dBm, then $$P_T = -46.5 + 53.4 = 6.9 \text{ dBm} \quad (15)$$

The transmitted power must therefore be greater than 6.9 dBm. From the earlier discussion, the noise must be 53 dB below this point, or −46.1 dBm. The output noise at the transmitter is given by $$N_T = \log(KTB) + G_T + F_T \quad (16)$$

Where $G_T$ and $F_T$ are the gain and the noise figure of the transmitter, an upper bound on these specifications is then $$G_T + F_T = -46.1 - 10 \log(KTB) = 61.9 \text{ dB} \quad (17)$$

From the above, the following specifications are seen to meet the requirements for a multi-channel transmitter operating a typical 15 mile link with 54 channels.

| | |
|---|---|
| Minimum intercept point | 48 dBm |
| Minimum Gain | 23 dB |
| Maximum Noise Figure | 38 dB |

The invention is not restricted to specific devices or circuits. As indicated above, a traveling wave tube (with a preamplifier) or FET amplifier may be used as the amplifier means 18. By way of specific example only, a suitable FET amplifier is MITEQ amplifier NO. AMFP-6B-127-132-30-5813. The oscillator 17 may comprise MITEQ oscilator No. PLM 12646C-20P-5811. Filter 17c may be a filter custom designed by Microwave Filter Co. and should satisfy all relevant FCC requirements.

Operation Summary

In FIG. 1, the input to the transmitter 10 is single 75 ohm input having up to 75 video channels in the frequency band 54–500 MHz. Each video carrier is typically at a level of 18 dBmV. The input is passed to a microwave double balanced mixer 17b which produces at its output a double sideband AM modulated version of the VHF input spectrum centered around the local oscillator frequency of 12.6465 GHz. The output level of the sideband carriers is approximately −38 dBm. The output of the mixer 17b is passed through a waveguide bandpass filter 17c with a pass band of 12.7–13.2 GHz. Skirts of the bandpass filter 17c are so arranged as to eliminate the lower sideband and carrier, producing a single sideband suppressed carrier version of the VHF input. Thus, the output of the bandpass filter 17c is a simple translation of the input VHF spectrum by 12.6465 GHz. The bandpass filter 17c is followed by a transistor amplifier 36 with 22 dB gain followed by a medium power TWT amplifier 34 having 25 dB gain. The final output is approximately 8 dBm per channel. A directional coupler 23 samples the microwave output. The sampled output is mixed again by a mixer 23a with the local oscillator frequency on the line 17a to produce a VHF output on a line 23b to monitor the quality of the transmitted signal and to provide automatic gain control for the amplifier 23c. Calibration data for the coupling coefficient and mixer conversion loss allows the use of the VHF monitor output to measure the microwave output power using a VHF spectrum analyzer.

As FIG. 2 shows, the received signal from the dish antenna 40 having a nominal input level of −45 dBm per channel is supplied to the transistor amplifier 44 having a gain of 22 dB. The signal then passes through a bandpass filter 48 having a pass band of 12.7–13.2 GHz. This filter 48 eleminates noise in the frequency spectrum below 12.7 GHz which would fall within the VHF output spectrum. The output of the filter 48 is mixed by the mixer 56 with the reference signal of 12.6465 GHz from the local oscillator 52 to perform a synchronous demodulation. The output of the mixer 56 is thus the downshifted spectrum which appears as a reproduction of the VHF spectrum input to the transmitter 10. The output of the mixer 56 passes through a VHF amplifier 60 which raises the signal level to a nominal 24 dBmV and provides automatic gain control to compensate for variations in path loss with changes in atmospheric conditions. The output of the VHF amplifier 60 may be used to distribute the VHF signal on a standard cable trunk system. In addition, a portion of this signal may be used as an input to another transmitter located on the same tower to perform a relay function, thus extending the range of the overall system.

Thus there is provided in accordance with the invention a novel and highly effective microwave communications system comprising a novel and highly effective microwave transmitter. The principles of the invention may be used to relay a multiplicity of information channels other than television channels (e.g., data processing), although the invention is particularly beneficial in the CATV industry in that it allows the simultaneous transmission of up to 75 video and audio channels over distances in excess of 20 miles. Many modifications of the preferred embodiments of the invention disclosed herein will readily occur to those skilled in the art. For example, the invention is adaptable to transmission at a frequency range other than the one indicated above; the number of separate amplifiers constituting the amplifier means 18 may be varied; the minimum acceptable quality of the signal received by the dish antenna 40 may be adjusted; the antennas 22 and 40 may be replaced by antennas of different sizes, etc.

What is claimed is:

1. A microwave transmitter having a gain and a noise figure for relaying information channels to any of a number of signal distribution systems, comprising:
    signal modulating means for receiving an input signal that includes a plurality of information channels and producing an amplitude modulated signal in the microwave frequency range, and amplifier means responsive to said microwave frequency signal for producing an amplified output signal suitable for microwave transmission to a remote location, said signal modulating means and said amplifier means having upper power limits which are sufficiently below their respective two-tone third order intermodulation intercept points that each has a carrier-to-triple-beat power ratio at least equal to first predetermined values dependent on the number of said information channels.

said amplifier means having a gain high enough that, notwithstanding power limitations of said signal modulating means, the power of said amplifier output signal is at least equal to a second predetermined value, whereby the sum of the gain and the noise figure of said transmitter measured in decibels has an upper limit determined by a desired carrier-to-noise ratio and by thermal noise.

2. A microwave transmitter according to claim 1 wherein said signal modulating means comprises:
oscillator means for generating a reference signal,
mixer means responsive to said input signal and said reference signal for generating a double sideband amplitude modulated signal corresponding to said input signal and having a central frequency bearing a predetermined relation to the frequency of said reference signal, and
bandpass filter means responsive to said double sideband amplitude modulated signal for producing said microwave frequency signal,
said amplitude modulated signal being a single sideband suppressed carrier signal translated with respect to said input signal by a frequency bearing a predetermined relation to the frequency of said reference signal.

3. A microwave transmitter according to claim 1 wherein said input signal is a VHF signal carrying at least 8 television program channels in the frequency band of 54-500 Mhz.

4. A microwave transmitter according to claim 1 wherein said amplifier means comprises a traveling wave tube amplifier.

5. A microwave transmitter according to claim 1 wherein said amplifier means comprises a transistor amplifier and a traveling wave tube amplifier connected thereto and driven thereby.

6. A microwave transmitter according to claim 1 wherein said amplifier means comprises a solid state amplifier.

7. A microwave transmitter according to claim 2 further comprising means for sampling said amplified output signal and means responsive to said sampling means for controlling the amplitude of said input signal to maintain said output signal at a desired level.

8. A microwave transmitter according to claim 1 wherein said second predetermined value dependes at least in part on the distance between a transmitter and said remote location.

9. In combination, a microwave transmitter according to claim 1 and a receiver, said receiver being adapted to receive said amplified output signal as a microwave input signal and comprising:
bandpass filter means responsive to said microwave input signal for producing a filtered signal from which noise having a frequency in the VHF frequency range is filtered out,
oscilator means for generating a reference signal,
mixer means responsive to said filtered signal and said reference signal for performing a synchronous demodulation and producing a VHF signal corresponding to said microwave signal, and
VHF amplifier means for amplifying said VHF signal for distribution on a cable trunk system.

10. For use in a microwave transmitter for relaying a plurality of information channels to any of a number of signal distribution systems, wherein signal modulating means receives an input signal that includes a plurality of information channels and produces an amplitude modulated signal in a microwave frequency range, the improvement comprising:
amplifier means having a gain and noise figure responsive to said amplitude modulated signal for producing an amplified output signal suitable for microwave transmission to a remote location,
said amplifier means having an upper power limit which is sufficiently below its two-tone third order intermodulation intercept point that it has a carrier-to-triple-beat power ratio at least equal to a first predetermined value which is dependent on the number of said information channels,
said amplifier means having a gain high enough that, notwithstanding any power limitation of said signal modulating means, the power of said amplifier output signal is at least equal to a second predetermined value dependent on the distance the output signal is to be transmitted, and
the sum of the gain and the noise figure of said amplifier means measured in decibels having an upper limit determined by a desired carrier-to-noise ratio of the output signal and by thermal noise.

11. A microwave transmitter according to claim 10 wherein said amplifier means comprises a transistor amplifier and a traveling wave tube amplifier connected thereto and driven thereby.

12. A microwave transmitter according to claim 11 wherein said amplifier means comprises a solid state amplifier.

* * * * *

UNITED STATES PATENT AND TRADEMARK OFFICE
CERTIFICATE OF CORRECTION

PATENT NO. : 4,475,242
DATED : October 2, 1984
INVENTOR(S) : Marc Rafal, William T. Joines, Larry W. Burton It is certified that error appears in the above-identified patent and that said Letters Patent are hereby corrected as shown below:

Column 4, line 32, change "forth" to -- fourth --;
Column 5, line 19, change "portion" to -- portions --;
Column 5, line 37, change "offer" to -- order --;

Column 11 (Claim 1), line 11, change "." to --, --;
Column 11 (Claim 3), line 42, change "Mhz" to --MHz--; and
Column 12 (Claim 12), line 53, change "11" to -- 10 --.

Signed and Sealed this

Ninth Day of July 1985

[SEAL]

Attest:

DONALD J. QUIGG

Attesting Officer    Acting Commissioner of Patents and Trademarks

REEXAMINATION CERTIFICATE (556th)
United States Patent [19]
Rafal et al.

[11] B1 4,475,242
[45] Certificate Issued    Aug. 12, 1986

[54] MICROWAVE COMMUNICATIONS SYSTEM

[75] Inventors: Marc Rafal; William T. Joines; Larry W. Burton, all of Durham, N.C.

[73] Assignee: Avnet Inc., Ellenville, N.Y.

Reexamination Request:
No. 90/000,833, Aug. 9, 1985

Reexamination Certificate for:
Patent No.: 4,475,242
Issued: Oct. 2, 1984
Appl. No.: 440,628
Filed: Nov. 10, 1982

Certificate of Correction issued Jul. 9, 1985.

[51] Int. Cl.[4] .......................... H04B 1/02; H04H 1/00
[52] U.S. Cl. .......................................... 455/3; 455/53; 455/109; 455/20
[58] Field of Search .................... 455/3, 6, 20, 46, 47, 455/53, 108, 109, 126; 358/86, 186; 332/31 R, 44, 45

[56] References Cited

U.S. PATENT DOCUMENTS

| | | | |
|---|---|---|---|
| 3,593,139 | 11/1971 | Hershberg | 455/20 |
| 3,623,105 | 11/1971 | Kamen | 455/3 |
| 4,183,054 | 1/1980 | Patisaul et al. | 455/3 |

OTHER PUBLICATIONS

Experimental Studies for Short Haul Multi-Channel Microwave System, Prepared for Teleprompter Corporation by Hughes Aircraft Co., May, 1965.
Amplitude Modulated Link; A Review of Its Development, by H. T. Ozaki & L. S. Stokes, Aerospace Group, Hughes Aircraft Co., TV Communications, Mar. 1968, pp. 42-49.
A Second Generation AML by N. A. Bergovich & L. S. Stokes, Hughes Aircraft Co., Culver City, Calif., pp. 1-20.
AML in Local Distribution Service, Mar. 1971, pp. 1-15.

*Primary Examiner*—Jin F. Ng

[57] ABSTRACT

A microwave transmitter comprises a signal modulator for receiving an input signal that includes up to 75 video and audio channels and producing an amplitude modulated signal in the microwave frequency range corresponding thereto. An amplifier responsive to the microwave frequency signal produces an amplified output signal suitable for transmission to a remote location. The signal modulator and the amplifier have upper power limits which are sufficiently below their respective two-tone third order intermodulation intercept points that the carrier-to-triple-beat power ratios of each are respectively at least equal to first predetermined values. The gain of the amplifier is high enough that, notwithstanding the power limitation imposed on the microwave frequency signal by virtue of the upper power limit of the signal modulating means, the power of the amplified output signal is at least equal to a second predetermined value. The sum of the gain and the noise figure of the transmitter measured in decibels has an upper limit determined by the desired carrier-to-noise ratio and by thermal noise.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *